Figure 6:
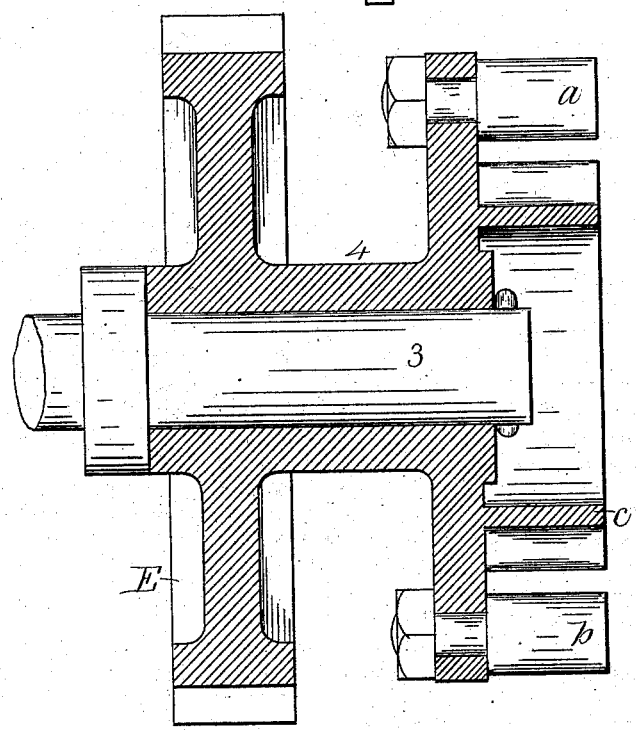

(No Model.) 2 Sheets—Sheet 1.
H. WYMAN.
MECHANICAL MOVEMENT.
No. 275,008. Patented Apr. 3, 1883.
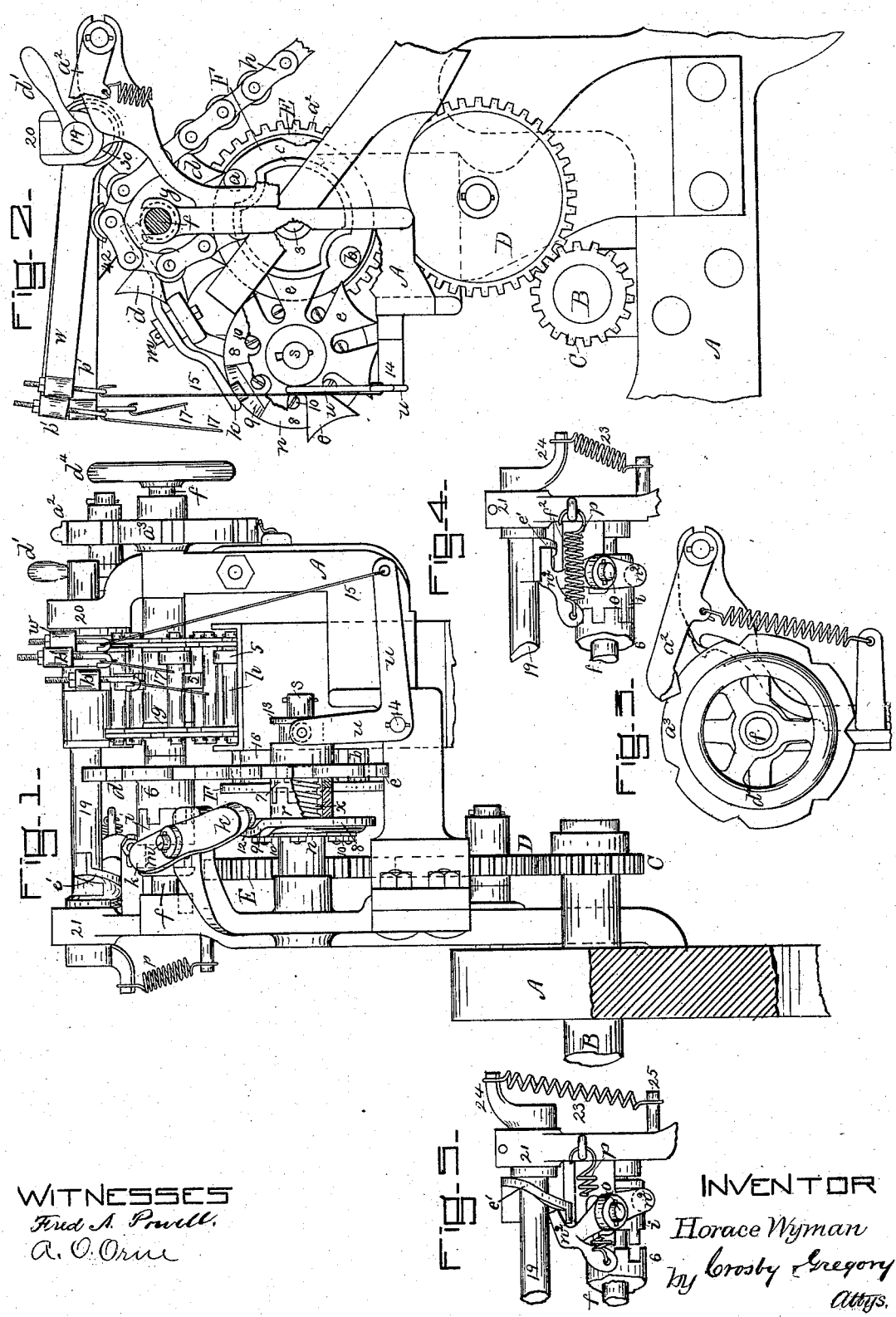
WITNESSES
Fred A. Powell.
A. O. Orne
INVENTOR
Horace Wyman
by Crosby Gregory
Attys.

(No Model.) 2 Sheets—Sheet 2.

H. WYMAN.
MECHANICAL MOVEMENT.

No. 275,008. Patented Apr. 3, 1883.

WITNESSES
Fred A. Powell.
A. O. Orne

INVENTOR
Horace Wyman
by Crosby & Gregory
Attys.

UNITED STATES PATENT OFFICE.

HORACE WYMAN, OF WORCESTER, MASSACHUSETTS.

MECHANICAL MOVEMENT.

SPECIFICATION forming part of Letters Patent No. 275,008, dated April 3, 1883.

Application filed January 26, 1883. (No model.)

*To all whom it may concern:*

Be it known that I, HORACE WYMAN, of Worcester, county of Worcester, State of Massachusetts, have invented an Improvement in Mechanical Movements, of which the following description, in connection with the accompanying drawings, is a specification, like letters on the drawings representing like parts.

The mechanical movement, the subject of this application, is more especially designed to operate a pattern-chain, and is applicable to any machine employing a pattern-chain.

In this my invention I have arranged to intermittingly rotate a main and an auxiliary pattern-surface through clutching-surfaces actuated positively from and so as to move in unison with a main driven shaft, and I have so arranged the indicating projections or rolls on the main pattern-surface that it is made instrumental in determining the periods of motion and of rest of the auxiliary pattern-surface, and the latter, by its change of position, in turn determines the periods of motion and of rest of the main pattern-surface, so that any row of indications or rolls thereon may be operative for a greater or less period. The bar-receiving recesses in the notched cylinder which carries the pattern-chain, correspond in number with the teeth and spaces on the clutching-surfaces referred to as being positively rotated from and in unison with the main shaft, in order that the teeth or spaces of each of the said clutching-surfaces may always be in proper position with relation to the co-operating toothed or clutching surface which is to be rotated by it to turn the said main or the auxiliary pattern-surface that the engagement of one or the other of the said clutching-surfaces may be effected whenever any bar of the main pattern chain or surface is in operative position with relation to the fingers resting upon it. The main pattern chain or surface, it having usual indicating rolls or projections, is extended over a hub fast on a shaft provided with a longitudinally-movable toothed clutching-hub splined thereon, and adapted to be engaged by the teeth of a toothed hub projecting from one side of a wheel, shown as a star-wheel, loose on the said shaft, but driven positively from and in unison with the main shaft. The clutching-hub referred to is under the control of an auxiliary pattern-surface, which latter, acting on a lever, slides the said hub on its shaft in one or the other direction when it is desired to operate the main pattern-cylinder or leave it at rest. The auxiliary pattern-surface, loose on a fixed stud and provided at one side with a toothed or clutching hub, is adapted to be engaged and moved by a clutching-surface on a second wheel, shown as a star-wheel, also loose on the said stud and driven positively from and in unison with the main shaft, the times of engagement of the toothed or clutching parts instrumental in turning the auxiliary pattern-surface or the disengagement of the said parts, to permit the auxiliary pattern-surface to remain at rest while the main pattern-surface is being moved, being controlled by rolls or indications on the bars of the main pattern-chain; or, in other words, the main pattern surface or chain while in motion acts through a lever to clutch the auxiliary surface, with its moving shaft, and set it in motion, and subsequently the auxiliary surface acts through another lever to unclutch the main pattern-surface and leave it at rest while the auxiliary surface is in motion. In this my invention both star-wheels are shown as moved by one common pin-wheel.

My invention consists in organizations of mechanical devices, as hereinafter described, and pointed out in the claims at the end of this specification, to effect the results here stated.

Figure 7:
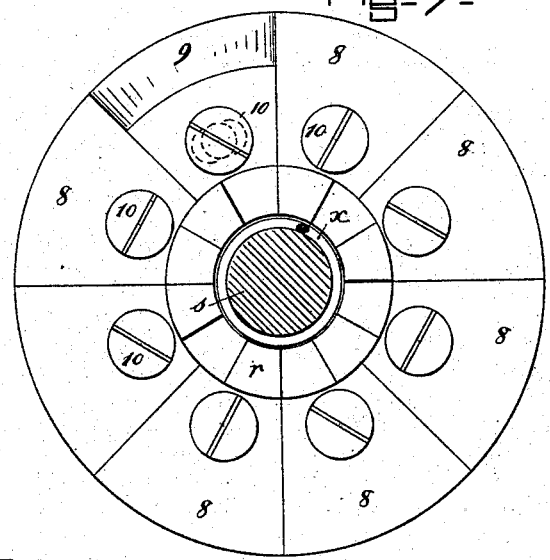

Figure 1 represents, in front elevation, an apparatus embodying my improvements in mechanism for actuating a pattern-chain; Fig. 2, a right-hand elevation thereof, but with the hand and check wheels broken off; Fig. 3, a detail of the check and hand wheels; Figs. 4 and 5, details of devices for stopping the pattern-chain by hand; Fig. 6, a longitudinal section of the pin-wheel and its connected gear-wheel; and Fig. 7, a face view of the auxiliary pattern-surface.

The frame A of the machine, which is to contain my apparatus, has a positively-rotated shaft, B, provided with a pinion, C, which engages an intermediate, D, that in turn engages and rotates a gear, E, loose on a stud, 3, and having attached to its hub 4, in front of the gear, a pin-wheel, F, shown as having two pins, $a$ $b$, and a flange, $c$. The pins of the pin-wheel engage and turn intermittingly two star-wheels, $d$ $e$. The star-wheel $d$ is loose on the shaft $f$, to which is fixed the notched cylinder $g$, over which is passed the pattern-chain $h$, having bars with rolls 5, all of usual construction. Splined on the shaft $f$ is a toothed clutching-hub, $i$, having an annular groove, to be engaged at its upper side by a pin or stud of a lever, $k$, pivoted at $m$, and at its lower side by a pin of a lever, $n^2$, pivoted at $o$ and normally acted upon by a spring, $p$, to push the hub $i$ toward the toothed clutching-hub 6 of the star-wheel $d$, and the pin 12 of lever $k$ against the indicating-surface of the auxiliary pattern-surface $n$. The star-wheel $d$, at its side next the toothed clutching-hub $i$, has a short hub, 6, provided with teeth to be engaged by the teeth of the hub $i$ when it is desired that the star-wheel $d$ turn the shaft $f$ and pattern-chain or to be disengaged from the said hub $i$, in order that the said star-wheel may run loose on the shaft $f$ and not move the said pattern-chain. The star-wheel $e$ has at its rear side a hollow hub, 7, provided with clutching-teeth adapted to be slid into engagement, at the desired times, with the teeth of the hollow clutching-hub $r$, placed loosely on the stud $s$, and forming part of the auxiliary pattern-surface, $n$, herein shown as made up of a series of plates, 8 9, secured to a flange of the hub $r$ by means of screws 10, thus enabling the said plates to determine the number of times that the auxiliary pattern-surface vibrates the lever $k$.

As herein shown, the cam-shaped plates 9, on their arrival opposite the pin 12 of the lever $k$, permit the said lever to be moved, through the instrumentality of the spring $p$ referred to, to clutch the toothed surfaces of the hubs $i$ and 6, and the arrival of the plates 8 against the said pin 12 causes the lever $k$ to be so moved as to disengage the toothed hubs $i$ and 6, and leave the shaft $f$ and main pattern-surface or chain at rest.

It is obvious that the plates 8 and 9 might be arranged to operate conversely; but I prefer the plan herein shown, for by permitting a spring to effect the movement of engagement liability of breakage of parts is obviated.

The star-wheel $e$, at its outer side, has an annularly-grooved hub, 13, which is engaged by a suitable pin or roll, carried by the elbow-lever $u$, pivoted at 14 and connected by wire 15 with the pivoted finger $w$, arranged over the main pattern surface or chain and its indications 42. (See Fig. 2.) When the finger is lifted by a roll, 42, of the main pattern-chain it forces the star-wheel $e$ to the left, as in Fig. 1, and engages the teeth of its toothed clutching-hub 7 with the teeth of the clutching-hub $r$, attached to the auxiliary pattern-surface $n$ referred to, and causes the said pattern-surface to be rotated in unison with it. When a space on the pattern-chain permits the finger $w$ to drop, then the spring $x$, Fig. 1, arranged between the said hubs, and preferably in chambers in them, acts to separate the teeth of the hubs 7 and $r$, and thereafter the auxiliary pattern-surface will remain at rest until again clutched with hub 7 by the lever $u$.

In Fig. 1 the auxiliary pattern-surface is about to be turned to move the lever $k$ and the clutching-hub $i$ to the left and disengage its teeth from the teeth of the hub 6 of the star-wheel $d$ and leave the pattern-chain $h$ at rest, it being so held after the disengagement of the clutch by the lever $a^2$, acting on the check-wheel $a^3$. (See Figs. 1 and 5.) The shaft $f$ has a hand-wheel, $d^4$, by which to turn it and the pattern-chain independently. The auxiliary pattern-surface $n$ does not stop when the pattern-chain is stopped; but its rotation is continued until, as herein shown, a depression in one of the cam-plates 9, attached thereto, arrives opposite the pin 12 on the lever $k$, when the spring $p$ referred to will effect the movement of the said lever and again cause the engagement of the clutching-hub $i$ with the hub 6 of the star-wheel $d$, and again start the pattern-chain $h$. As soon as the main pattern-chain starts, the roll thereon, which lifted the finger $w$ to effect the engagement of the teeth of the hub 7 of the star-wheel $e$ with the teeth of the hub $r$ of the auxiliary pattern-surface $n$, passes from under the said finger $w$ and permits the spring $x$ in or between the hubs $r$ and 7 to act and effect the disengagement of the star-wheel $e$ from the auxiliary pattern-surface, and the latter will thereafter remain at rest until the lever $w$ is again moved by a roll, 42, on the pattern-surface $n$. The teeth and spaces between the star-wheels $d$ and $e$ and the toothed hubs moved by them are such with relation to each other and the notches of the notched cylinder which carries the main pattern-chain that the teeth or notches of the hub of either star-wheel may be moved out from or into engagement with the hubs $i$ or $r$ by means of handle $d'$, as will be described, while any row of rolls or indications of the pattern-chain is in operative position, which is essential in order to permit either pattern-surface to be stopped or started when any row of indications is placed in operative position.

The flange 16 of the pin-wheel F, and its pins $a$ $b$, are sufficiently long to permit the star-wheel $e^*$ to be reciprocated longitudinally on its stud by the lever $u$ without being disengaged from the said pin-wheel. The series of fingers $b'$, resting on the pattern-chain, will be connected by wires 17 with other levers or mechanical parts, to be moved thereby in accordance with the demands of the pattern-surface. The fingers $w$ and $b'$ have their fulcra on an eccentric portion, 30, of a shaft, 19, held in bearings 20 21. When it is desired to turn the pattern-chain by hand the shaft 19 will be turned by its handle $d'$ to lift the rear ends of the fingers $w$ and $b'$ from the pattern surface or chain, and at the same time an inclined cam, $e'$, on the shaft 19, will strike the upper end of the lever $n^2$, pivoted at $o$ at the rear side of the shaft 19, it having, as stated, a pin, which engages the annular groove of the hub $i$ at its under side, and will move the said hub to the left, thus disengaging it from the hub 6 of the star-wheel $d$, leaving the pattern-chain $h$ free to be turned by hand, and the latter having been turned into proper position, the shaft 19 may be again moved to properly lower the rear ends of the fingers $w$ and $b'$. The holding-lever $a^2$, acting on the check-wheel $a^3$, prevents the accidental rotation of the said shaft and pattern-chain.

It will be noticed that both pattern-surfaces, when moved, are moved positively, and that neither can get out of time with relation to the other or the shaft B, which is the common source of motion for them.

The star-wheels $d$ and $e$, provided with the clutching hubs or surfaces, are, it will be noticed, driven positively from and in unison with the main shaft B, and they intermittingly but in a positive manner drive the clutching hubs or surfaces $i$ and $r$, which are respectively operatively connected with the main and auxiliary pattern-surfaces.

Under the arrangement herein shown the auxiliary pattern-surface is rotated intermittingly, and its times of starting and stopping are controlled by rolls or indications on the main pattern-surface. By moving the auxiliary pattern-surface intermittingly, rather than continuously, it is possible to greatly shorten the said surface, and yet enable it to effect numerous stops and starts of the main pattern-surface.

I have herein shown the toothed surfaces or hubs 6 7 as attached to star-wheels engaged by a pin-wheel containing two pins, $a$ $b$, actuated positively from a gear on and driven in unison with the main shaft, so that the established positions of the teeth of the hubs 6 and 7 with relation to each other, the hubs operated by them, and the main shaft may always remain the same; but while preferring the pin-wheel with two pins to move the star-wheels intermittingly, I desire it to be understood that the pin-wheel might have a sufficient number of pins to engage the star-wheels and move them and the hubs 6 7 continuously from the main shaft; and, instead of the pin-wheel and the star-wheel, I might employ any other well-known or usual toothed gearing to rotate the said hubs 6 7 continuously.

The main pattern-surface carries, it will be seen, a series of rolls or indications, which serve through intermediate devices, as described, to enable the said surface to effect its intermitting movements in a positive manner.

I do not desire to limit my invention to any particular shape or form of auxiliary pattern-surface, but may use instead of it any usual pattern-surface.

The shaft 19 has an arm, 24, acted upon by a spring, P, attached to a pin, 25, the said spring normally holding the shaft 19, as in Figs. 1, 2, and 4.

I claim—

1. The auxiliary pattern-surface and the main pattern surface or chain provided with a row of indications or rolls to control the order of movement of the auxiliary pattern-surface, combined with intermediate connecting devices to positively engage and move the said auxiliary pattern-surface intermittingly or with periods of rest, according to the demands of the main pattern surface or chain, substantially as described.

2. The auxiliary pattern-surface and gearing to move it intermittingly or with periods of rest, combined with the main pattern-surface and devices operated by it to effect the periods of movement and rest of the said auxiliary pattern-surface, substantially as described.

3. The positively-moved toothed hubs 6 7, combined with the main and auxiliary pattern-surfaces and their connected toothed hubs, either of which latter may be moved by its proper hub, 6 or 7, according to indications moving with the main pattern-surface, substantially as described.

4. The toothed clutching-hubs 6 7, the main shaft, and intermediate gearing to drive the same positively therefrom, combined with two toothed clutching-hubs and main and auxiliary pattern-surfaces actuated respectively by them, whereby the starting and stopping of the auxiliary pattern-surface is controlled by indications on the main pattern-surface, and the times of starting and stopping the main pattern-surface by the position of the indications on the auxiliary pattern-surface, substantially as described.

5. The notched cylinder to support the pattern-chain, and a main and auxiliary pattern-surface, and toothed clutching-hubs operatively connected therewith, combined with two toothed clutching hubs or surfaces, 6 7, the main shaft, and intermediate gearing to drive the latter hubs positively, the said hubs 6 7 having their teeth or spaces arranged, substantially as described, with relation to the notches in the said toothed cylinder whereby the toothed clutching-surfaces to operate the main and auxiliary pattern-surfaces will occupy such position with relation to the toothed hubs to be actuated by them as to permit their engagement whenever any row of indications of the main pattern-surface is in operative position with relation to the movement of the main shaft.

In testimony whereof I have signed my name to this specification in the presence of two subscribing witnesses.

HORACE WYMAN.

Witnesses:
J. A. WARE,
J. B. SYME.